(12) United States Patent
Nakanishi

(10) Patent No.: US 11,782,654 B2
(45) Date of Patent: Oct. 10, 2023

(54) COMMUNICATION SYSTEM, NON-TRANSITORY COMPUTER-READABLE RECORDING MEDIUM STORING COMPUTER-READABLE INSTRUCTIONS FOR AUTHENTICATION SERVER, AND NON-TRANSITORY COMPUTER-READABLE RECORDING MEDIUM STORING COMPUTER-READABLE INSTRUCTIONS FOR PRINTER

(71) Applicant: BROTHER KOGYO KABUSHIKI KAISHA, Nagoya (JP)

(72) Inventor: Yuta Nakanishi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/814,321

(22) Filed: Jul. 22, 2022

(65) Prior Publication Data
US 2023/0032333 A1 Feb. 2, 2023

(30) Foreign Application Priority Data
Jul. 30, 2021 (JP) .................. 2021-125493

(51) Int. Cl.
*G06F 3/12* (2006.01)
*H04L 9/40* (2022.01)

(52) U.S. Cl.
CPC .......... *G06F 3/1222* (2013.01); *G06F 3/1236* (2013.01); *G06F 3/1238* (2013.01); *G06F 3/1288* (2013.01); *H04L 63/0884* (2013.01)

(58) Field of Classification Search
None
See application file for complete search history.

(56) References Cited

U.S. PATENT DOCUMENTS 8,994,990 B2 * 3/2015 Kimura ................. G06F 3/1259
358/1.15
2013/0321846 A1 * 12/2013 Hiroshige .......... G06K 15/4095
358/1.14

(Continued)

FOREIGN PATENT DOCUMENTS

JP 2005004400 A 1/2005
JP 2017049767 A 3/2017

*Primary Examiner* — Haris Sabah
(74) *Attorney, Agent, or Firm* — Scully, Scott, Murphy & Presser, PC

(57) ABSTRACT

An authentication server may, in a case where a communication state between the authentication server and a management server is a non-connecting state, send first authentication information to an external device. A printer may, in a case where a communication state between the printer and the management server changes from a communication-enabled state to a communication-disabled state, shift a state of the printer from a first permission state to a first prohibition state, while the state of the printer is the first prohibition state, accept an input of second authentication information from a user; and, in a case where the input of the second authentication information is accepted and the second authentication information matches the first authentication information, shift the state of the printer from the first prohibition state to a second permission state.

23 Claims, 9 Drawing Sheets

(56) References Cited

U.S. PATENT DOCUMENTS

| | | | |
|---|---|---|---|
| 2015/0153978 A1* | 6/2015 | Ito | H04W 76/00 |
| | | | 358/1.15 |
| 2017/0063646 A1 | 3/2017 | Kawai | |
| 2018/0321888 A1* | 11/2018 | Rosemann | G06F 3/1248 |
| 2021/0334053 A1* | 10/2021 | Matsuura | G06F 3/1256 |

* cited by examiner

FIG.2

Print Table 38

| User ID | Device ID | E-mail Address | OFF-Printed Sheet | ON-Printed Sheet | Print Limit |
|---|---|---|---|---|---|
| U1 | dv1 | AD1 | 10 | 10 | 10 |
| ... | ... | ... | ... | ... | ... |

Management Table 238

| User ID | Device ID | E-mail Address | Payment Information | Number of Printed Sheets | Contractual Number of Print Sheets |
|---|---|---|---|---|---|
| U1 | dv1 | AD1 | PI1 | 100 | 1000 |
| ... | ... | ... | ... | ... | ... |

Authentication Table 338

| User ID | Device ID | E-mail Address | One-Time Code | OFF-Printed Sheet (Second Embodiment) | ON-Printed Sheet (Second Embodiment) | Print Limit (Second Embodiment) |
|---|---|---|---|---|---|---|
| U1 | dv1 | AD1 | - | - | - | - |
| ... | ... | ... | ... | ... | ... | ... |

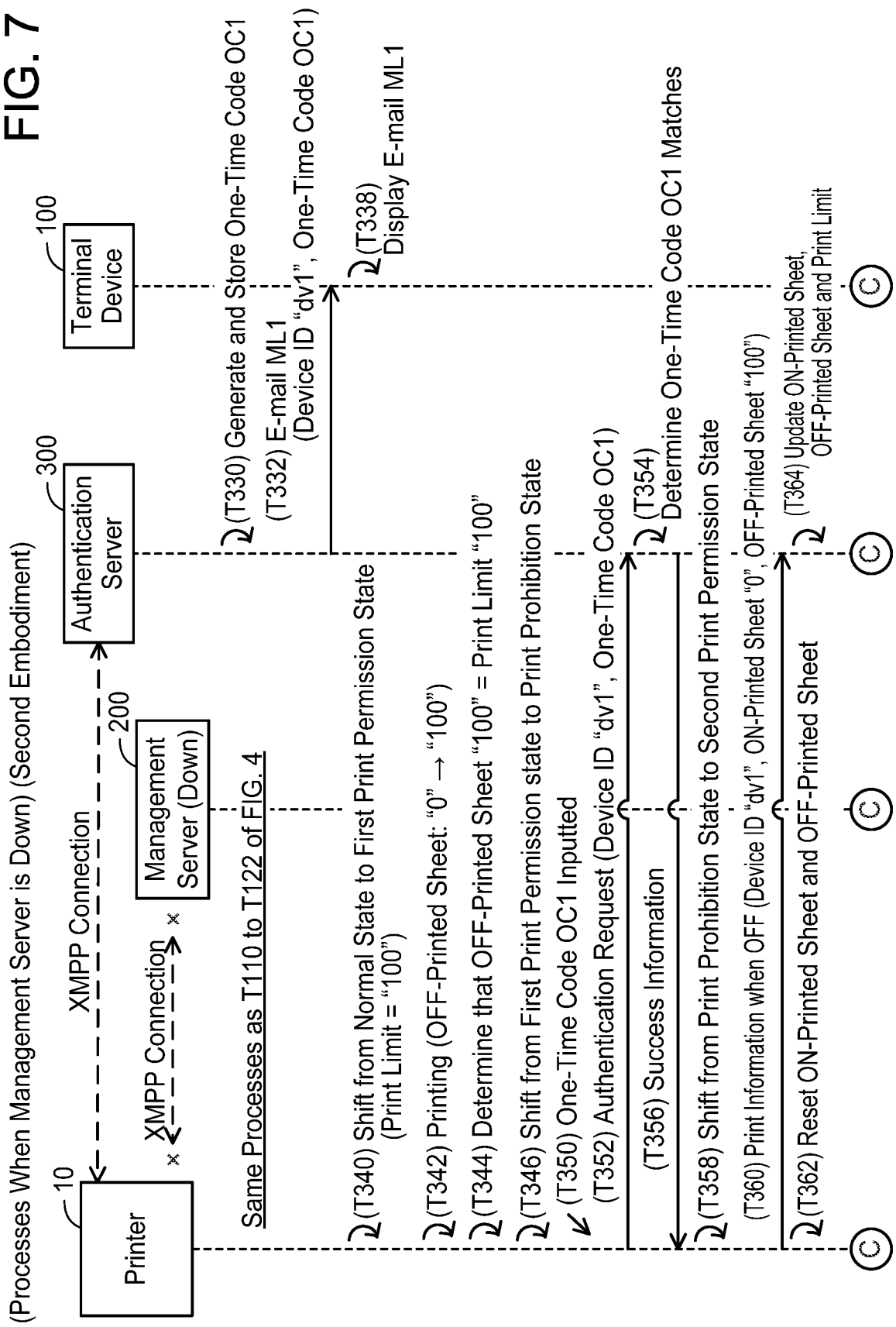

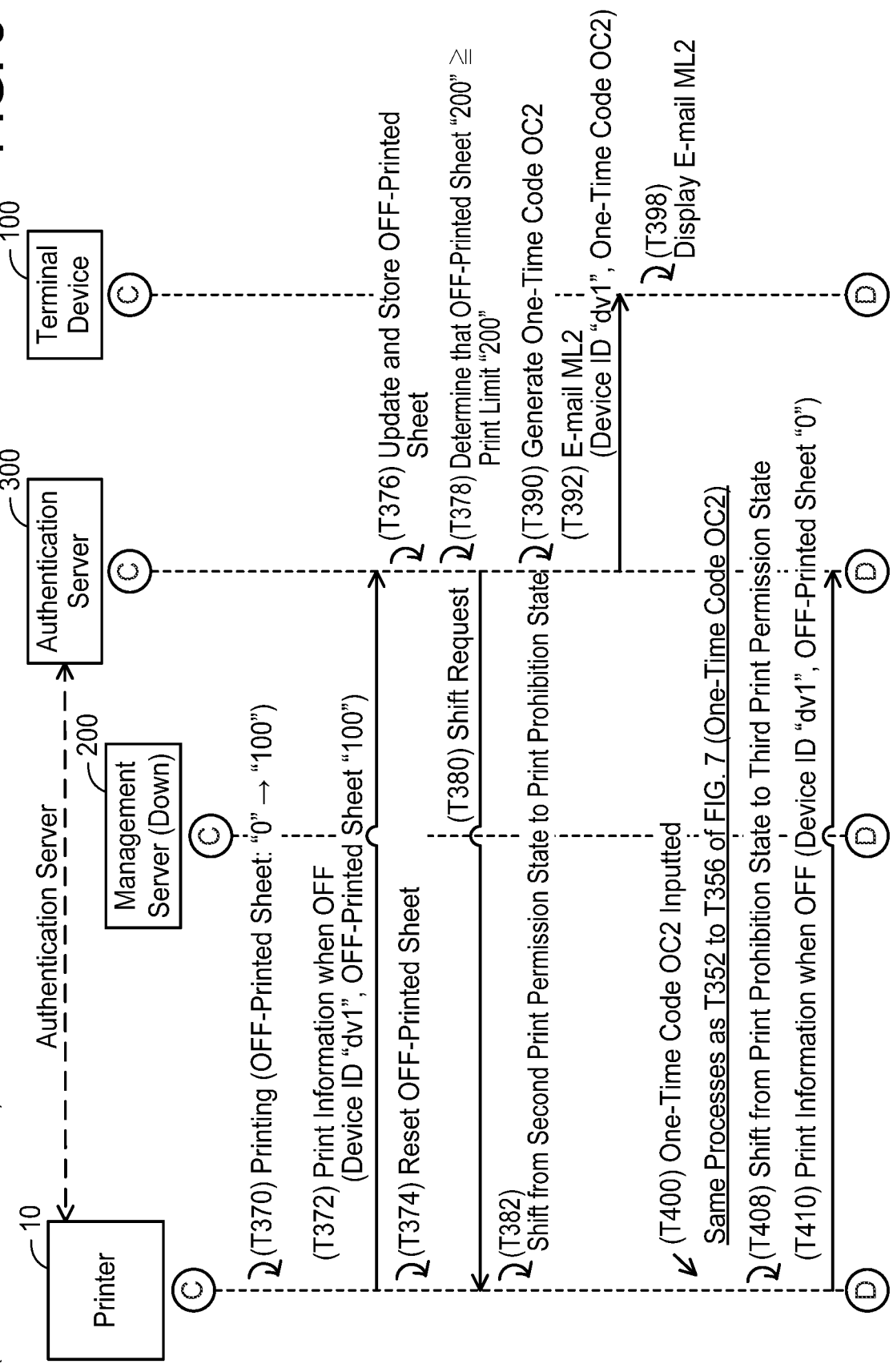

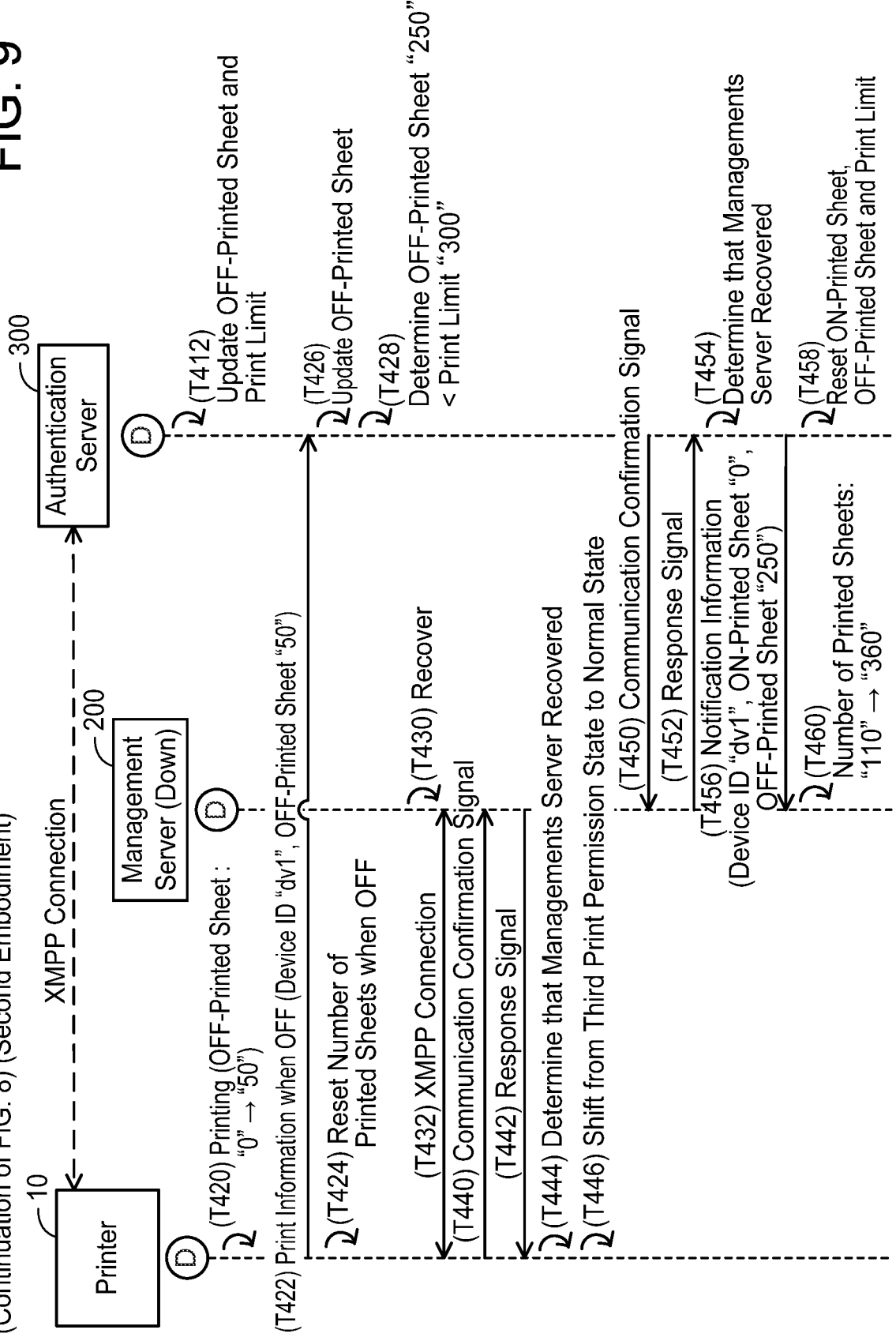

COMMUNICATION SYSTEM, NON-TRANSITORY COMPUTER-READABLE RECORDING MEDIUM STORING COMPUTER-READABLE INSTRUCTIONS FOR AUTHENTICATION SERVER, AND NON-TRANSITORY COMPUTER-READABLE RECORDING MEDIUM STORING COMPUTER-READABLE INSTRUCTIONS FOR PRINTER

REFERENCE TO RELATED APPLICATIONS

This application claims priority to Japanese Patent Application No. 2021-125493, filed on Jul. 30, 2021, the entire contents of which are hereby incorporated by reference into the present application.

BACKGROUND ART

A communication system including a printer, a PC and an information management server is known. Each time a flat-rate printing process is executed, the printer stores print information related to the number of printed sheets and sends the print information to the information management server. The information management server manages the print information when the information management server receives the print information from the printer. The information management server uses the print information received from the printer to provide a service of the flat-rate printing process.

DESCRIPTION

In a communication system as above, not much consideration is given to a situation in which an information management server cannot execute communication due to the information management server being down.

The present disclosure provides a technique which enables a printer to execute printing when a management server cannot execute communication due to malfunction of the management server.

The present disclosure discloses a communication system comprising: a printer; a management server; and an authentication server. The management server may comprise: a controller configured to: receive, from the printer, usage information related to usage of the printer and manage the usage information. The authentication server may comprise: a controller configured to: in a case where a communication state between the authentication server and the management server is a communication-disable state, send first authentication information to an external device. The printer may comprise: a controller configured to: in a case where a communication state between the printer and the management server changes from a communication-enabled state to a communication-disabled state, shift a state of the printer from a first permission state in which printing is permitted to a first prohibition state in which printing is prohibited; while the state of the printer is the first prohibition state, accept an input of second authentication information from a user; and in a case where the input of the second authentication information is accepted and the second authentication information matches the first authentication information, shift the state of the printer from the first prohibition state to a second permission state in which printing is permitted.

Further, the present disclosure discloses a non-transitory computer-readable recording medium storing computer-readable instructions for an authentication server used in a communication system. The communication system may comprise: a printer; a management server; and the authentication server. The authentication server may comprise: a processor, wherein the computer-readable instructions, when executed by the processor, cause the authentication server to: in a case where a communication state between the authentication server and the management server is a communication-disabled state, send first authentication information to an external device, wherein the management server is configured to receive usage information related to usage of the printer from the printer and is configured to manage the received usage information. The printer may be configured to: in a case where a communication state between the printer and the management server changes from a communication-enabled state to a communication-disabled state, shift a state of the printer from a first permission state in which printing is permitted to a first prohibition state in which printing is prohibited; while the state of the printer is the first prohibition state, accept an input of second authentication information from a user; and in a case where the input of the second authentication information is accepted and the second authentication information matches the first authentication information, shift the state of the printer from the first prohibition state to a second permission state in which printing is permitted.

Further, the present disclosure discloses a non-transitory computer-readable recording medium storing computer-readable instructions for a printer used in a communication system. The communication system may comprise: the printer; a management server; and an authentication server. The printer may comprise: a processor, wherein the computer-readable instructions, when executed by the processor, cause the printer to: in a case where a communication state between the printer and the management server changes from a communication-enabled state to a communication-disabled state, shift a state of the printer from a first permission state in which printing is permitted to a first prohibition state in which printing is prohibited, wherein the management server is configured to manage usage information related to usage of the printer and received from the printer, wherein the authentication server is configured to, in a case where a communication state between the authentication server and the management server is a communication-disabled state, send first authentication information to an external device; while the state of the printer is the first prohibition state, accept an input of second authentication information from a user; and in a case where the input of the second authentication information is accepted and the second authentication information matches the first authentication information, shift the state of the printer from the first prohibition state to a second permission state in which printing is permitted.

According to the above configuration, the authentication server sends the first authentication information to the external device in the case where the authentication server cannot communicate with the management server due to malfunction of the management server. When the printer cannot communicate with the management server due to malfunction of the management server, the printer shifts the state of the printer from the first permission state to the first prohibition state. The printer shifts the state of the printer from the first prohibition state to the second permission state in the case where the input of the second authentication information is accepted and the second authentication information matches the first authentication information while the state of the printer is the first prohibition state. According to the above configuration, it is possible to cause the printer to execute printing when the management server cannot execute communication due to malfunction of the management server.

Further, the present disclosure discloses a method. The method may comprise: receiving from a printer usage information related to usage of the printer and managing the usage information; in a case where a communication state between an authentication server and a management server is a communication-disabled state, sending first authentication information to an external device; in a case where a communication state between the printer and the management server changes from a communication-enabled state to a communication-disabled state, shifting a state of the printer from a first permission state in which printing is permitted to a first prohibition state in which printing is prohibited; while the state of the printer is the first prohibition state, accepting an input of second authentication information from a user; and in a case where the input of the second authentication information is accepted and the second authentication information matches the first authentication information, shifting the state of the printer from the first prohibition state to a second permission state in which printing is permitted.

With the above configuration, it is possible to cause the printer to execute printing when the management server cannot execute communication due to malfunction of the management server.

An authentication server implemented by the computer-readable instructions for the above-described authentication server and a computer-readable recording medium storing the computer-readable instructions as above are also novel and useful. A printer implemented by the computer readable instructions for the above-described printer and a computer-readable recording medium storing the computer-readable instructions as above are also novel and useful.

FIG. 2 illustrates respective tables.

FIG. 7 illustrates a sequence of a process executed when the management server is down in a second embodiment.

FIG. 8 illustrates a sequence continued from FIG. 7.

FIG. 9 illustrates a sequence continued from FIG. 8.

Figure 1:
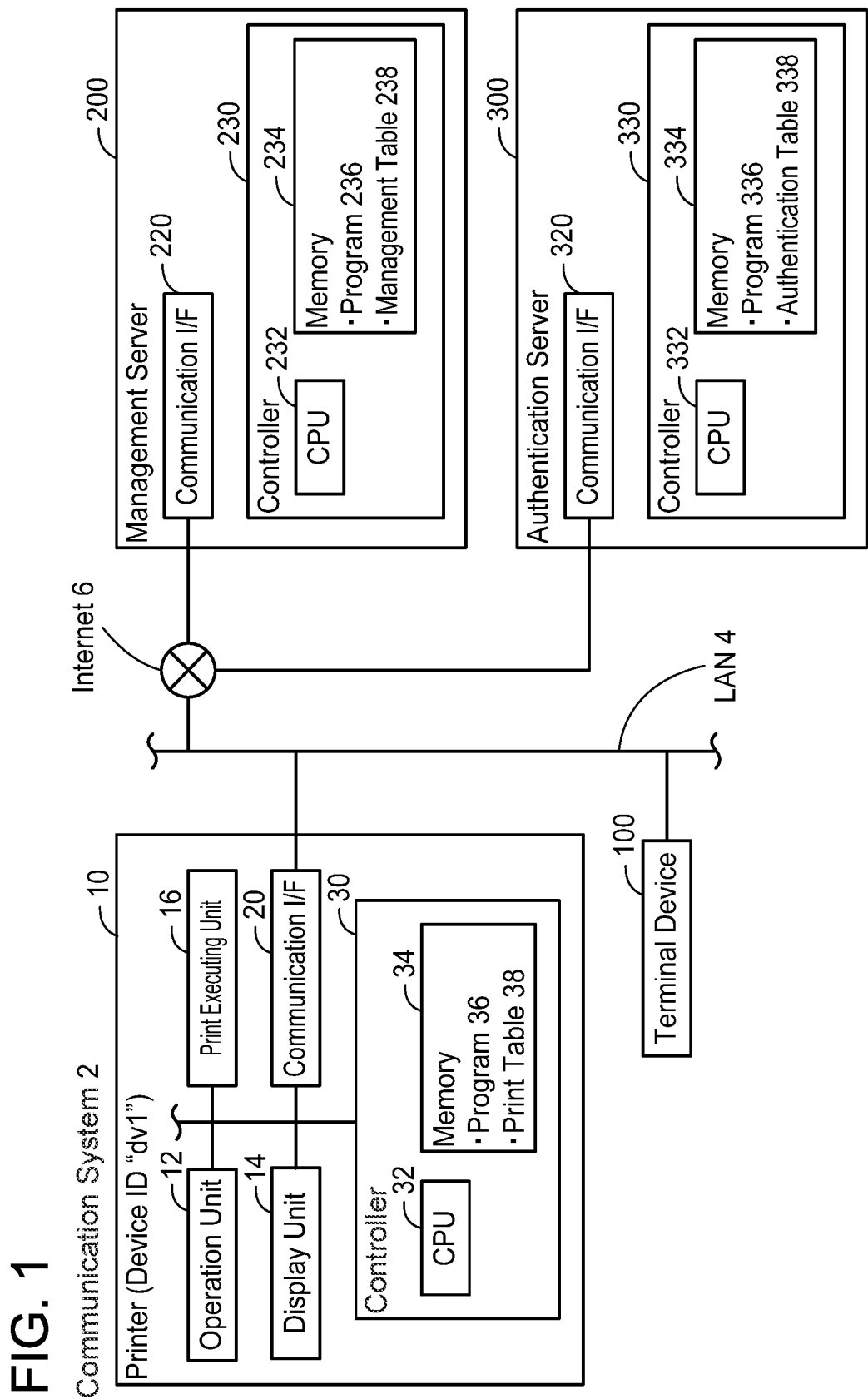
FIG. 1 illustrates a configuration of a communication system.

FIRST EMBODIMENT (Configuration of Communication System 2: FIG. 1)

As illustrated in FIG. 1, a communication system 2 includes a printer 10, a terminal device 100, a management server 200 and an authentication server 300. The printer 10 and the terminal device 100 are connected to a Local Area Network (LAN) 4. The LAN 4 is connected to the Internet 6. The printer 10 and the terminal device 100 are configured to communicate with each other via the LAN 4. The management server 200 and the authentication server 300 are connected to the Internet 6. The printer 10, the terminal device 100, the management server 200 and the authentication server 300 are configured communicate with each other via the Internet 6. The management server 200 provides a charging service which charges fees depending on the number of sheets the printer 10 has printed.

(Configuration of Printer 10)

The printer 10 is a peripheral device configured to execute a printing function (i.e., peripheral device of a PC, for example). The printer 10 may be a multi-function peripheral configured to execute a scan function, a facsimile function, and the like as well as the printing function. The printer 10 includes an operation unit 12, a display unit 14, a print executing unit 16, a communication interface 20, and a controller 30. A device ID "dv1" for identifying the printer 10 is given to the printer 10. Hereafter, the interface will be referred to as "I/F".

The operation unit 12 includes a plurality of keys. The user can input various instructions to the printer 10 by operating the operation unit 12. The display unit 14 is a display for displaying various information.

The print executing unit 16 is a printing mechanism of an inkjet scheme. A cartridge which contains ink is attached to the print executing unit 16. The print executing unit 16 executes printing using the ink in the cartridge. A cartridge number for identifying the cartridge is given to the cartridge. The cartridge number is a unique character string given to each cartridge when a plurality of cartridges is manufactured. The cartridge includes a dedicated cartridge available only when the charging service is provided, and a general cartridge available when the charging service is not provided. When the dedicated cartridge is attached to the print executing unit 16, the printer 10 operates in any one of a normal state, a print permission state, and a print prohibition state. The normal state is a state in which execution of printing is permitted. The print permission state is a state in which execution of printing is permitted but execution of printing of a predetermined number of sheets or more is restricted. The print prohibition state is a state in which execution of printing is prohibited.

The communication I/F 20 is connected to the LAN 4. The communication I/F 20 may be a wireless I/F or a wired I/F.

The controller 30 includes a CPU 32 and a memory 34. The CPU 32 executes various processes in accordance with a program 36 stored in the memory 34. The memory 34 is configured of a volatile memory, a nonvolatile memory, and the like. The memory 34 further stores a print table 38.

(Configuration of Management Server 200)

The Management server 200 is provided on the Internet 6 by a vendor of the printer 10. In a modification, the management server 200 may be provided on the Internet 6 by a provider different from the vendor. In another modification, the vendor of the printer 10 may use an environment provided by an external cloud computing service without preparing its own hardware for the management server 200. In this case, the vendor of the printer 10 may prepare a program for the management server 200 (i.e., a software) and introduce it in the aforementioned environment to implement the management server 200. The management server 200 provides a flat-rate charging service (hereafter referred to as "flat-rate service") and an automatic order service. The flat-rate service is a service of charging a predetermined amount of fees when the number of sheets printed within a predetermined period (e.g., one month) is less than or equal to a contractual number of print sheets (e.g., 1000 sheets). The automatic order service is a service of automatically ordering new dedicated cartridge(s) when an amount of ink remaining in the dedicated cartridge attached to the print executing unit 16 of the printer 10 falls to or a below a predetermined amount. In a modification, instead of the flat-rate service, the management server 200 may provide a pay-as-you-print charging service of charging fees depending on the number of sheets printed within a predetermined period (e.g., one month).

The management server 200 includes a communication I/F 220 and a controller 230. The communication I/F 220 is connected to the Internet 6. The controller 230 includes a CPU 232 and a memory 234. The CPU 232 executes various processes in accordance with a program 236 stored in the memory 234. The memory 234 is configured of a volatile memory, a nonvolatile memory, and the like. The memory 234 further stores a management table 238.

(Configuration of Authentication Server 300)

The Authentication server 300 is provided on the Internet 6 by the vendor of the printer 10. In a modification, the authentication server 300 may be provided on the Internet 6 by a provider different from the vendor. In another modification, the vendor of the printer 10 may use an environment provided by an external cloud computing service without preparing its own hardware for the authentication server 300. In this case, the vendor of the printer 10 may prepare a program for the authentication server 300 (i.e., a software) and introduce it in the aforementioned environment to implement the authentication server 300. When the management server 200 cannot execute communication due to malfunction of the management server 200, the authentication server 300 generates a one-time code for continuously using the flat-rate service. The one-time code is a password valid for a predetermined time after the one-time code is created and can be used only once.

The authentication server 300 includes a communication I/F 320 and a controller 330. The communication I/F 320 is connected to the Internet 6. The controller 330 includes a CPU 332 and a memory 334. The CPU 332 executes various processes in accordance with a program 336 stored in the memory 334. The memory 334 is configured of a volatile memory, a nonvolatile memory, and the like. The memory 334 further stores an authentication table 338.

(Configurations of Respective Tables: FIG. 2)

Next, referring to FIG. 2, the contents of the print table 38 of the printer 10, the management table 238 of the management server 200, and the authentication table 338 of the authentication server 300 will be described.

In the print table 38 of the printer 10, the number of sheets printed while ON (which hereafter may be referred to as "ON-printed sheet"), the number of sheets printed while OFF (which hereafter may be referred to as "OFF-printed sheet") and the print limit are stored in association with each other. Information in the print table 38 is information used when the dedicated cartridge is attached to the print executing unit 16, in other words, the flat-rate service is provided (which hereafter may be referred to as "service state"). The ON-printed sheet is information indicative of the number of print sheets printed by the print executing unit 16 in the state in which the printer 10 is in the service state and a communication state between the printer 10 and the management server 200 is a communication-enabled state (which hereafter may be referred to as "first communication-enabled state"). The OFF-printed sheet is information indicative of the number of sheets printed by the print executing unit 16 in the state in which the printer 10 is in the service state and the communication state between the printer 10 and the management server 200 is a communication-disabled state (which hereafter may be referred to as "first communication-disabled state"). The print limit is information indicative of the number of sheets that can be printed using the print executing unit 16 in the state in which the printer 10 is in the service state and the communication state is the first communication-disabled state.

In the management table 238 of the management server 200, a user ID for identifying a user, a device ID, an e-mail address of the user, payment information, the number of printed sheets and the contractual number of print sheets are stored in association with each other. The payment information is information related to a payer of fees (e.g., credit card number). The number of printed sheets is information indicative of the number of sheets printed within a predetermined period (e.g., one month). The contractual number of print sheets is information indicative of the number of print sheets that can be printed by paying predetermined fees.

In the authentication table 338 of the authentication server 300, a user ID, a device ID, an e-mail address and a one-time code are stored in association with each other.

Figure 3:
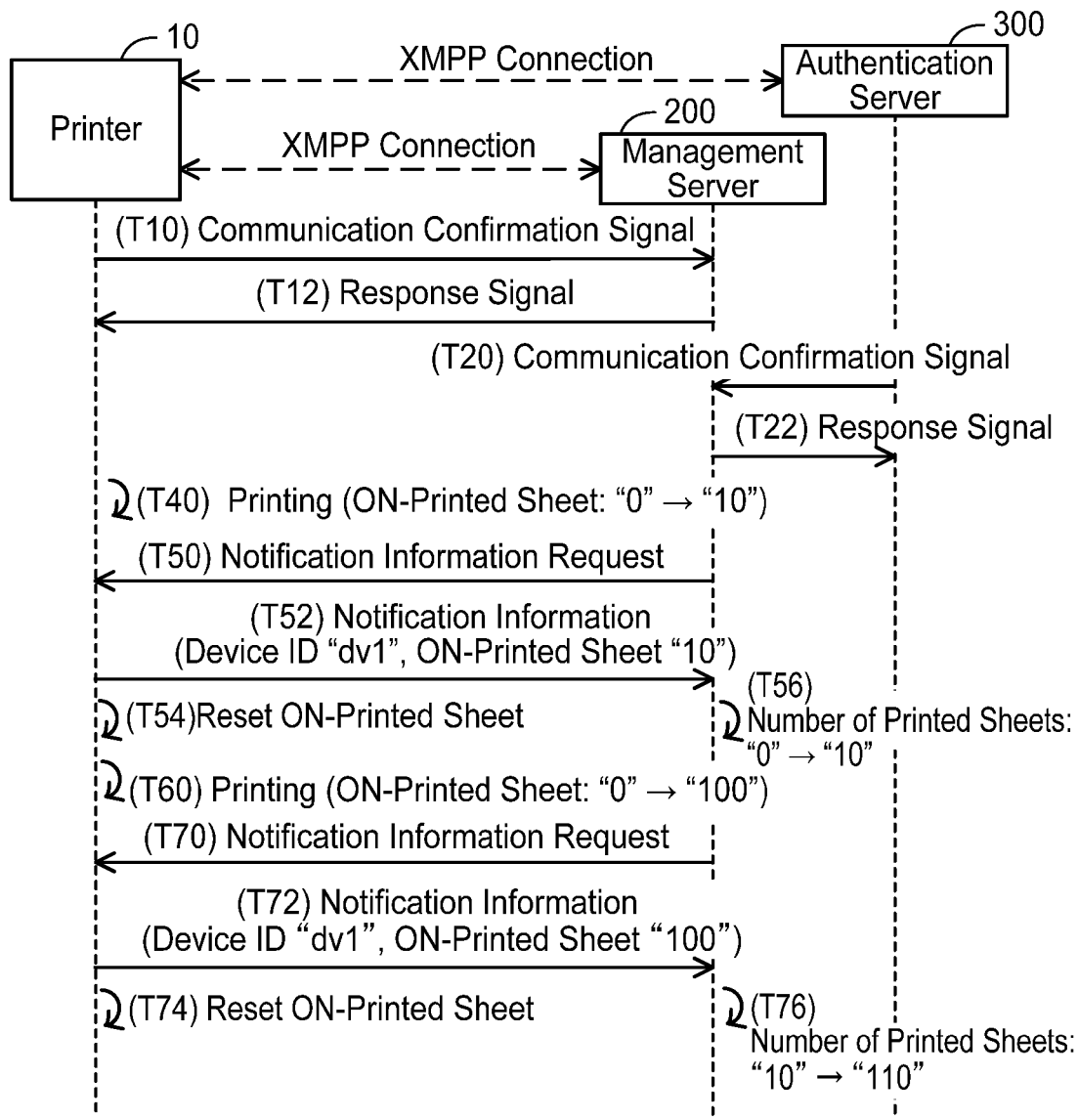
FIG. 3 illustrates a sequence of processes executed when a management server operates normally.

(Processes Executed when Management Server 200 Operates Normally: FIG. 3)

Next, referring to FIG. 3, processes executed among the printer 10, the management server 200 and the authentication server 300 in the state in which the management server 200 operates normally will be described. An initial state of FIG. 3 is a state right after a registration process for using the flat-rate service provided by the management server 200 has been completed. Therefore, in the management table 238 of the management server 200, a user ID "U1", a device ID "dv1", an e-mail address AD1, payment information PI1, the number of printed sheets "0", and the contractual number of print sheet "1000" are stored in association with each other. In the authentication table 338 of the authentication server 300, the user ID "U1", the device ID "dv1" and the e-mail address AD1 are stored in association with each other. No one-time code is stored in the authentication table 338. Further, in the print table 38 of the printer 10, the ON-printed sheet "0" and the OFF-printed sheet "0" are stored in association with each other. No information is stored in the print limit of the print table 38. In the registration process, an XMPP connection is established between the printer 10 and the management server 200. The XMPP connection is a so-called always-on connection and remains established until the printer 10 is powered off. By using the XMPP connection, the management server 200 can send a request to the printer 10 beyond a firewall of the LAN 4 to which the printer 10 belongs without receiving a request from the printer 10. A configuration to send a request from the management server 200 to the printer 10 may be different method from the XMPP connection. For example, a Hypertext Transfer Protocol Secure (HTTPS) connection may be established between the printer 10 and the management server 200. In the registration process, the XMPP connection is also established between the printer 10 and the authentication server 300. The dedicated cartridge is attached to the print executing unit 16 of the printer 10. The state of the printer 10 is the normal state in which execution of printing is permitted. Hereafter, each device (e.g., printer 10) will be described as a subject of a process instead of describing the CPU of each device (e.g., CPU 32 of the printer 10) as the subject of the process. Communication to be executed by each device will be executed via the communication I/F of each device (e.g., the communication I/F 20 of the printer 10). Therefore, hereafter, the phrase "via the communication I/D" will be omitted when the process related to the communication via the communication I/F is described.

In T10, the printer 10 sends a communication confirmation signal to the management server 200 and receives a response signal from the management server 200 in T12. The communication confirmation signal is a signal for confirming whether communication with a device to which the communication confirmation signal is sent is enabled. In particular, the communication confirmation signal of T10 is a signal periodically sent to maintain the XMPP connection between the printer 10 and the management server 200. When the printer 10 receives the response signal in response to the communication confirmation signal from the management server 200, the printer 10 determines that a communication state is the state in which the XMPP connection with the management server 200 is maintained, in other words, the first communication-enabled state. When the printer 10 does not receive the response signal from the management server 200, the printer 10 determines that the communication state is the state in which the XMPP connection with the management server 200 is not maintained, in other words, the first communication-disabled state. The printer 10 periodically sends the communication confirmation signal to the management server 200 after T12 as well.

In T20, the Authentication server 300 sends the communication confirmation signal to the management server 200 and receives the response signal from the management server 200 in T22. When the authentication server 300 receives the response signal from the management server 200, the authentication server 300 determines that a communication state between the authentication server 300 and the management server 200 is a communication-enabled state (which hereafter may be described as "second communication-enabled state"). When the authentication server 300 does not receive the response signal from the management server 200, the authentication server 300 determines that the communication state between the authentication server 300 and the management server 200 is a communication-disabled state (which hereafter may be described as "second communication-disabled state"). The authentication server 300 periodically sends the communication confirmation signal to the management server 200 after T22 as well.

When the printer 10 executes printing in T40, the printer 10 calculates the number of printed sheets "10" used in this printing and updates the ON-printed sheet in the print table 38 from "0" to "10".

When a notification time (e.g., 12 hours) elapses after establishment of the XMPP connection with the printer 10, the management server 200 sends a notification information request to the printer 10 in T50. The notification information request is a signal for requesting sending of notification information (i.e., the device ID, the number of printed sheets, and an amount of remaining ink) necessary for the management server 200 to provide the flat-rate service. Hereafter, explanations about the amount of remaining ink in the notification information will be omitted.

When the printer 10 receives the notification information request from the management server 200 in T50, the printer 10 identifies the ON-printed sheet "10" in the print table 38 and sends the notification information including the device ID "dv1" and the identified ON-printed sheet "10" to the management server 200 in T52. Next, in T54, the printer 10 updates (i.e., resets) the ON-printed sheet in the print table 38 from "10" to "0".

When the management server 200 receives the notification information from the printer 10 in T52, the management server identifies the device ID "dv1" in the notification information and identifies the number of printed sheets "0" in the management table 238 associated with the identified device ID "dv1". Next, the management server 200 adds the ON-printed sheet "10" in the notification information to the identified number of printed sheets "0" in T56. Consequently, the number of printed sheets in the management table 238 is updated from "0" to "10".

T60 is the same as T50 except that the number of print sheets used in the printing is "100". When a notification time (e.g., 12 hours) elapses after sending of the notification information request, the management server 200 sends the notification information request to the printer 10 in T70. T72 is the same as T52 except that the ON-printed sheet in the notification information is "100". T74 is the same as T54.

When the management server 200 receives the notification information from the printer 10 in T72, the management server 200 identifies the device ID "dv1" in the notification information and identifies the number of printed sheets "10" in the management table 238 associated with the identified device ID "dv1". Next, the management server 200 adds the ON-printed sheet "100" in the notification information to the identified number of printed sheets "10" in T76. Consequently, the number of printed sheets in the management table 238 is updated from "10" to "110". Thereafter, each time the notification time elapses, the management server 200 sends the notification information request to the printer 10 and receives the notification information from the printer 10. Then, when a predetermined period (e.g., one month) elapses, the management server 200 identifies the number of printed sheets in the management table 238 and determines whether the identified number of printed sheets is greater than the contractual number of print sheets in the management table 238. When the identified number of printed sheets is smaller than or equal to the contractual number of print sheets, the management server 200 uses the payment information PI1 in the management table 238 and charges the user of the printer 10 predetermined fees. When the identified number of printed sheets is greater than the contractual number of print sheets, the management server 200 identifies additional fees corresponding to the number of sheets constituting the difference between the identified number of printed sheets and the contractual number of print sheets and uses the payment information PI1 in the management table 238 to charge the user of the printer 10 total fees of the predetermined fees and the additional fees.

Figure 4:
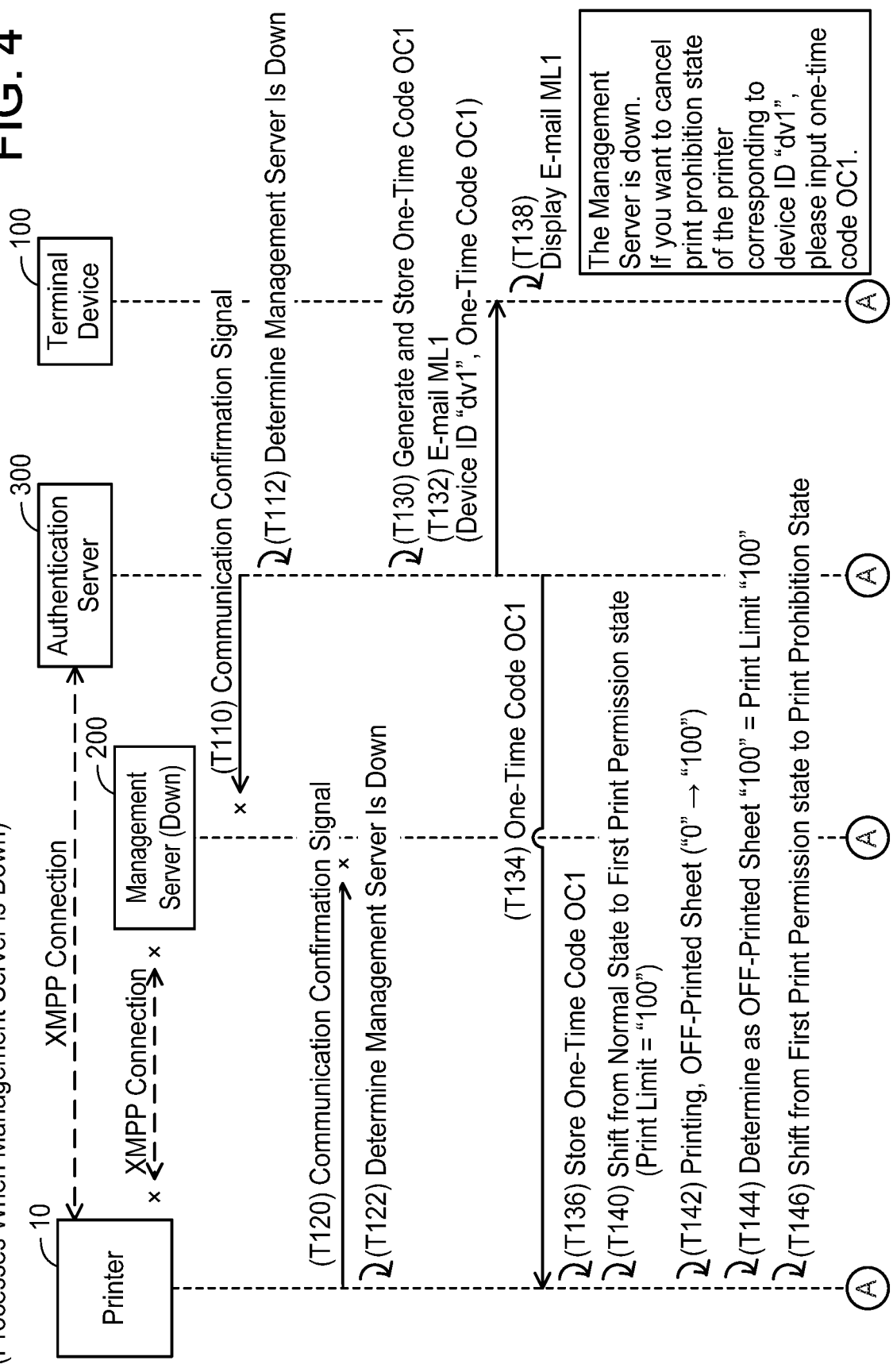
FIG. 4 illustrates a sequence of processes executed when the management server is down.
Figure 5:
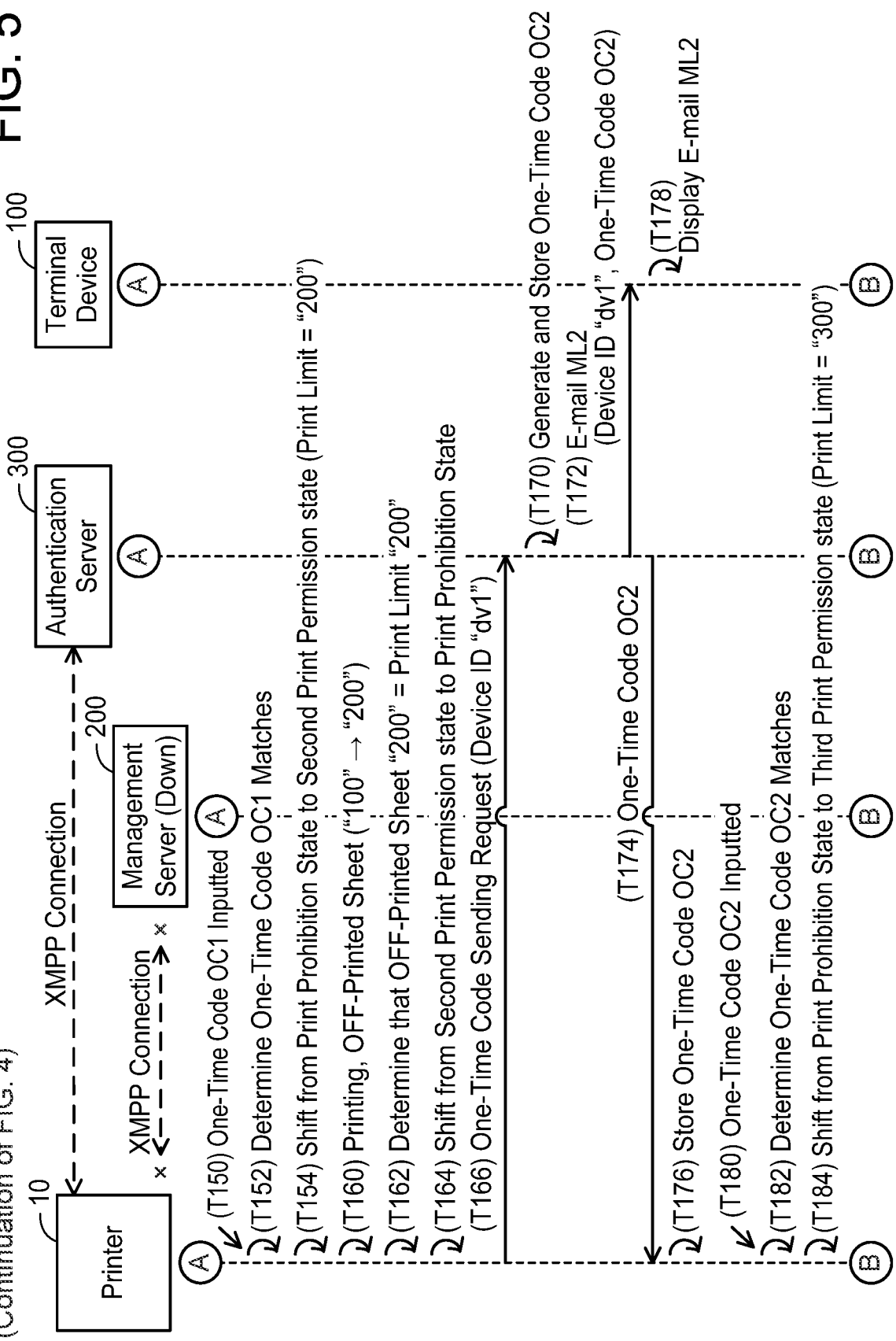
FIG. 5 illustrates a sequence continued from FIG. 4.
Figure 6:
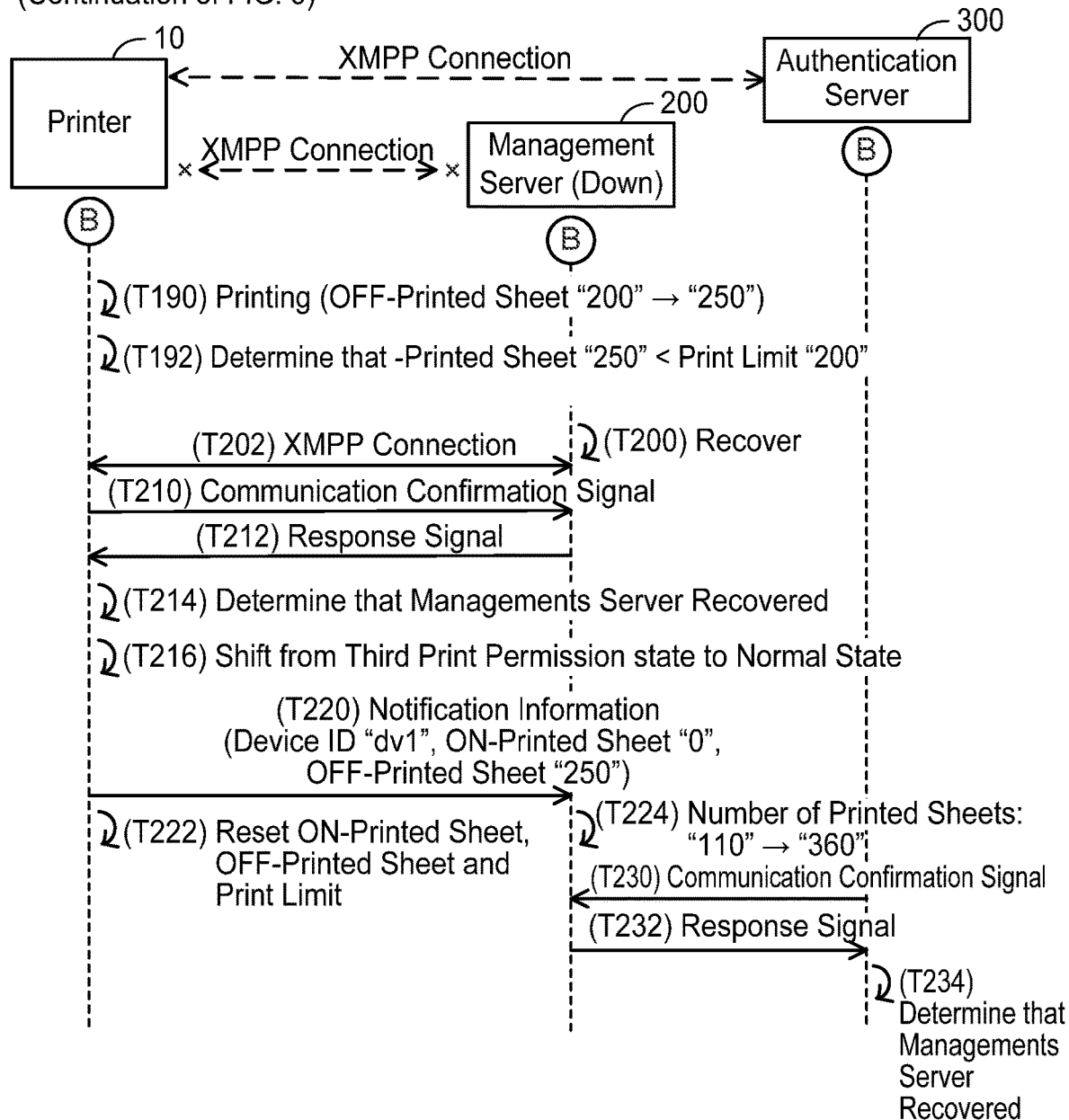
FIG. 6 illustrates a sequence continued from FIG. 5.

(Processes Executed when Management Server 200 is Down; FIG. 4 to FIG. 6)

Next, referring to FIG. 4 to FIG. 6, processes executed among the printer 10, the management server 200 and the authentication server 300 in the state in which the management server 200 is down due to malfunction of the management server 200 will be described. FIG. 4 is a state after FIG. 3 in which the management server 200 is down. Therefore, "110" is stored as the number of printed sheets in the authentication table 338 of the authentication server 300. When the management server 200 is down, the communication state between the printer 10 and the management server 200 is the first communication-disabled state, the communication state between the authentication server 300 and the management server 200 is the second communication-disabled state, and the communication state between the printer 10 and the authentication server 300 is the communication-enabled state.

The authentication server 300 sends the communication confirmation signal to the management server 200 in T110. In the present case, since the management server 200 is down, the authentication server 300 does not receive the response signal. Since the authentication server 300 does not receive the response signal in response to the communication confirmation signal, the authentication server 300 determines in T112 that the management server 200 is down.

The printer 10 sends the communication confirmation signal to the management server 200 in T120. Since the printer 10 does not receive the response signal from the management server 200, the printer 10 determines in T122 that the management server 200 is down. In a modification, the printer 10 and the authentication server 300 may determine that the management server 200 is down when the printer 10 and the authentication server 300 do not receive the response signal from the management server 200 despite the XMPP connection between the printer 10 and the authentication server 300 being maintained.

When the authentication server 300 determines in T112 that the management server 200 is down, the authentication server 300 generates a one-time code OC1 and store the generated one-time code OC1 in the authentication table 338 in association with the device ID "dv1" in T130. Next, the authentication server 300 identifies the e-mail address AD1 associated with the device ID "dv1" in the authentication table 338, generates an e-mail ML1 including the device ID "dv1" and the one-time code OC1 and sends the e-mail ML1 with the identified e-mail address AD1 as the recipient address in T132. Further, the authentication server 300 sends the one-time code OC1 to the printer 10 in T134.

When the printer 10 receives the one-time code OC1 from the authentication server 300 in T134, the printer 10 stores the one-time code OC1 in the memory 34 in T136.

When the terminal device 100 receives the e-mail ML1 from the authentication server 300 in T132 and accepts an operation to display the e-mail ML1, the terminal device 100 displays the e-mail ML1 in T138. The body of the e-mail ML1 describes a message indicating that the management server 200 is down and a message indicating that the print prohibition state of the printer 10 can be released by using the one-time code OC1. Consequently, the user of the terminal device 100 (i.e., the user of the printer 10) can learn that the print prohibition state of the printer 10 can be released by using the one-time code OC1.

When the printer 10 determines that the management server 200 is down, the printer 10 shifts the state of the printer 10 from the normal state to a first print permission state in T140. The first print permission state is the state in which execution of printing is permitted but execution of printing of more than a first predetermined number of sheets (e.g., 100 sheets) is restricted. The first predetermined number of sheets is a value smaller than the contractual number of print sheets. The printer 10 stores "100" as the print limit in the print table 38. Consequently, execution of printing using the dedicated cartridge is restricted. One reason for shifting the state of the printer 10 from the normal state to the first print permission state when the communication state between the printer 10 and the management server 200 changes from the first communication-enabled state to the first communication-disabled state is as follows. When the communication state between the printer 10 and the management server 200 is the first communication-disabled state, the notification information is not sent from the printer 10 to the management server 200. In other words, the number of printed sheets required for the management server 200 to provide the flat-rate service is not sent from the printer 10 to the management server 200. In this case, the management server 200 cannot suitably provide the flat-rate service. To avoid such a situation, the state of the printer 10 shifts from the normal state to the first print permission state when the communication state between the printer 10 and the management server 200 changes from the first communication-enabled state to the first communication-disabled state.

When the printer 10 executes printing in T142, the printer 10 calculates the number of printed sheets "100" used in this printing and updates the OFF-printed sheet in the print table 38 from "0" to "100". Next, the printer 10 determines in T144 that the OFF-printed sheet "100" in the print table 38 matches the print limit "100", in other words, the OFF-printed sheet has reached the print limit, and shifts the state of the printer 10 from the first print permission state to the print prohibition state in T146. As described above, when the communication state between the printer 10 and the management server 200 changes from the first communication-enabled state to the first communication-disabled state, the printer 10 shifts the state of the printer 10 to the first print permission state and then to the print prohibition state. With such a configuration, as compared to the case in which the state of the printer 10 is shifted to the print prohibition state without going through the first print permission state, user convenience can be enhanced.

Next, in T150 of FIG. 5, the printer 10 accepts input of the one-time code OC1 on the operation unit 12. As described above, the user of the printer 10 is notified of the information to release the print prohibition state of the printer 10 (i.e., the one-time code OC1) (see T132, T138). Therefore, the user of the printer 10 inputs the one-time code OC1 to release the print prohibition state of the printer 10. In T152, the printer 10 determines that the inputted one-time code OC1 matches the one-time code OC1 stored in the memory 34 (see T136 of FIG. 4), and shifts the state of the printer 10 from the print prohibition state to a second print permission state in T154. The second print permission state is the state in which execution of printing is permitted but execution of printing of more than a second predetermined number of sheets (e.g., 100 sheets) is restricted. The second predetermined number of sheets is a value smaller than the contractual number of print sheets. The second predetermined number of sheets may be the same as or different from the first predetermined number of sheets. The printer 10 identifies the print limit "100" in the print table 38 and adds the second predetermined number of sheets "100" to the identified print limit "100" to store the new print limit "200" in the print table 38. As describe above, by virtue of the printer 10 executing authentication using the one-time code, a time required for the authentication can be reduced, as compared to the configuration in which the printer 10 sends a different device a one-time code and the authentication is executed using the one-time code by the different device. Further, by virtue of the printer 10 accepting the input of the one-time code OC1 on the operation unit 12, the one-time code can be prevented from being used by a third party. Accordingly, security can be enhanced.

When the printer 10 executes printing in T160, the printer 10 calculates the number of printed sheets "100" used in this printing and updates the OFF-printed sheet in the print table 38 from "100" to "200". Next, the printer 10 determines in T162 that the OFF-printed sheet "200" in the print table 38 matches the print limit "200", in other words, the OFF-printed sheet has reached the print limit, and shifts the state of the printer 10 from the second print permission state to the print prohibition state in T164. With such a configuration, printing can be prevented from being unlimitedly permitted after the state of the printer 10 has been shifted to the second print permission state in the state in which the communication state between the printer 10 and the management server 200 is the first communication-disabled state. Next, in T166, the printer 10 sends a one-time code sending request including the device ID "dv1" to the authentication server 300. The one-time code sending request is a signal for requesting sending of a new one-time code. As described above, it is not necessary for the user of the printer 10 to access the authentication server 300 to execute an operation to cause the authentication server 300 to send a new one-time code in order for the printer 10 to send the one-time code sending request to the authentication server 300.

Accordingly, user convenience for the user of the printer 10 can be enhanced.

When the communication state between the printer 10 and the management server 200 changes from the first communication-disabled state to the first communication-enabled state before the OFF-printed sheet reaches the print limit while the state of the printer 10 is the second print permission state, the printer 10 shifts the state of the printer 10 from the second print permission state to the normal state. In this case, the printer 10 does not send the one-time code sending request to the authentication server 300. With such a configuration, execution of unnecessary communication between the printer 10 and the authentication server 300 can be suppressed.

When the authentication server 300 receives the one-time code sending request from the printer 10 in T166, the authentication server 300 identifies the device ID "dv1" in this request and generates a new one-time code OC2 and stores the generated one-time code OC2 in the authentication table 338 in association with the identified device ID "dv1" in T170. T172 to T178 are the same as T132 to T138 of FIG. 4 except that the one-time code OC2 is used and an e-mail ML2 includes the one-time code OC2. Since the e-mail ML2 is sent to the terminal device 100, the user of the printer 10 can use the new one-time code OC2.

T180, T182 are the same as T150, T152 except that the one-time code OC2 is used. The printer 10 shifts the state of the printer 10 from the print prohibition state to a third print permission state in T184. The third print permission state is the state in which execution of printing is permitted but execution of printing of more than a third predetermined number of sheets (e.g., 100 sheets) is restricted. The third predetermined number of sheets is a value smaller than the contractual number of print sheets. The third predetermined number of sheets may be the same as or different from the second predetermined number of sheets. The printer 10 identifies the print limit "200" in the print table 38 and adds the third predetermined number of sheets "100" to the identified print limit "200" and stores the new print limit "300" in the print table 38.

When the printer 10 executes printing in T190 of FIG. 6, the printer 10 calculates the number of printed sheets "50" used in this printing and updates the OFF-printed sheet in the print table 38 from "200" to "250". Next, the printer 10 determines in T192 that the OFF-printed sheet in the print table 38 "250" is less than the print limit "300", in other words, the OFF-printed sheet has not reached the print limit, and maintains the third print permission state.

In the present case, the malfunction of the management server 200 is resolved in T200 and the management server 200 recovers to the normal state. In response to the management server 200 recovering to the normal state, the XMPP connection between the printer 10 and the management server 200 is re-established in T202. In other words, the communication state between the printer 10 and the management server 200 changes from the first communication-disabled state to the first communication-enabled state. Further, the communication state between the authentication server 300 and the management server 200 changes from the second communication-disabled state to the second communication-enabled state.

When the printer 10 sends the communication confirmation signal to the management server 200 in T210, the printer 10 receives the response signal from the management server 200 in T212. In this case, the printer 10 determines in T214 that the management server 200 has recovered to the normal state and shifts the state of the printer 10 from the third print permission state to the normal state in T216. Next, the printer 10 identifies the ON-printed sheet "0" and the OFF-printed sheet "250" in the print table 38 and sends, to the management server 200, the notification information including the device ID "dv1", the identified ON-printed sheet "0", and the identified OFF-printed sheet "250" in T220. As described above, the notification information sent for the first time after the management server 200 having recovered to the normal state includes the OFF-printed sheet. Next, the printer 10 resets the ON-printed sheet, the OFF-printed sheet, and the print limit in the print table 38 in T222.

When the management server 200 receives the notification information from the printer 10 in T220, the management server 200 identifies the device ID "dv1" in the notification information and identifies the number of printed sheets "110" in the management table 238 associated with the identified device ID "dv1". Next, the management server 200 adds the OFF-printed sheet "250" in the notification information to the identified number of printed sheets "110" in T224. Consequently, the number of printed sheets in the management table 238 is updated from "110" to "360".

The authentication server 300 sends the communication confirmation signal to the management server 200 in T230 and receives the response signal from the management server 200 in T232. In this case, the authentication server 300 determines in T234 that the management server 200 has recovered to the normal state.

(Effects of Present Embodiment)

With the above configuration, when the authentication server 300 cannot communicate with the management server 200 due to malfunction of the management server 200 (FIG. 4), the authentication server 300 sends the one-time code OC1 to the terminal device 100 (T132 of FIG. 4). When the printer 10 cannot communicate with the management server 200 due to malfunction of the management server 200 (FIG. 4), the printer 10 shifts the state of the printer 10 from the normal state to the print prohibition state (T146 of FIG. 4). When input of the one-time code OC1 is accepted and authentication using the one-time code OC1 succeeds while the state of the printer 10 is the print prohibition state (T152 of FIG. 5), the printer 10 shifts the state of the printer 10 from the print prohibition state to the second print permission state (T154 of FIG. 5). Consequently, when the management server 200 cannot execute communication due to malfunction of the management server 200, it is possible to cause the printer 10 to execute printing.

(Corresponding Relationships)

The number of printed sheets included in the notification information is an example of "usage information". The one-time code OC1 in T132, T134 of FIG. 4 is an example of "first authentication information". The normal state is an example of "first permission state". The print prohibition state in T146 of FIG. 4 is an example of "first prohibition state". The one-time code OC1 in T150 of FIG. 5 is an example of "second authentication information". The second print permission state in T154 of FIG. 5 is an example of "second permission state". The first print permission state in T140 of FIG. 4 is an example of "third permission state". The OFF-printed sheet reaching the first predetermined number of print sheets in T144 of FIG. 4 is an example of "first predetermined condition". The first predetermined number of sheets is an example of "first predetermined amount". The OFF-printed sheet reaching the second predetermined number of print sheets in T162 of FIG. 5 is an example of "second predetermined condition". The second predetermined number of sheets is an example of "second predetermined amount". The print prohibition state in T164 of FIG. 5 is an example of "second prohibition state". The one-time code sending request is an example of "authentication information sending request". The one-time code OC2 in T172, T174 of FIG. 5 is an example of "third authentication information". The one-time code OC2 in T180 of FIG. 5 is an example of "fourth authentication information". The third print permission state in T184 of FIG. 5 is an example of "fourth permission state".

T56, T76 of FIG. 3 is an example of the process "receive, from the printer, usage information related to usage of the printer and manage the usage information" by "the management server". T132 of FIG. 4 is an example of the process "send first authentication information to an external device" by "the authentication server". T146 of FIG. 4 is an example of the process "shift a state of the printer from a first permission state in which printing is permitted to a first prohibition state in which printing is prohibited" by "the printer". T150 of FIG. 5 is an example of the process "accept an input of second authentication information from a user" by "the printer". T154 of FIG. 5 is an example of the process "shift the state of the printer from the first prohibition state to a second permission state in which printing is permitted" by "the printer".

SECOND EMBODIMENT

Next, the communication system 2 of a second embodiment will be described. As illustrated in FIG. 2, the ON-printed sheet, the OFF-printed sheet and the print limit are stored in the authentication table 338 of the authentication server 300.

(Process Executed when Management Server 200 is Down; FIG. 7 to FIG. 9)

Next, referring to FIG. 7 to FIG. 9, a process executed among the printer 10, the management server 200 and the authentication server 300 in the state in which the management server 200 is down due to malfunction of the management server 200 will be described. FIG. 7 is a state after FIG. 3 in which the management server 200 is down.

First, processes same as the T11 to T122 of FIG. 4 are executed among the printer 10, the management server 200 and the authentication server 300. T330, T332, T338 are the same as T130, T132, T138 of FIG. 4, respectively. The authentication server 300 of the present embodiment does not send the one-time code OC1 to the printer 10.

T340 to T346, and T350 are the same as T140 to T146 of FIG. 4, and T150 of FIG. 5, respectively. When the printer 10 accepts input of the one-time code OC1 in T350, the printer 10 sends, to the authentication server 300, an authentication request including the device ID "dv1" and the inputted one-time code OC1 in T352.

When the authentication server 300 receives the authentication request from the printer 10 in T352, the authentication server 300 identifies the device ID "dv1" in the authentication request and identifies the one-time code OC1 in the authentication table 338 associated with the identified device ID "dv1". Next, the authentication server 300 determines that the one-time code OC1 in the authentication request matches the identified one-time code OC1 in T354, and sends, to the printer 10, success information indicating that the authentication using the one-time code has succeeded in T356. As describe above, by virtue of the authentication server 300 executing the authentication using the one-time code, leak of the one-time code can be prevented, as compared to the configuration in which the authentication server 300 sends a one-time code to a different device. Accordingly, security can be enhanced.

When the printer 10 receives the success information from the authentication server 300 in T356, the printer 10 shifts the state of the printer 10 from the print prohibition state to the second print permission state, identifies the ON-printed sheet "0" and the OFF-printed sheet "100" in the print table 38 in T358, sends print information while OFF including the device ID "dv1", the identified ON-printed sheet "0" and the identified OFF-printed sheet "100" to the authentication server 300 in T360, and resets the ON-printed sheet and the OFF-printed sheet in the print table 38 in T362.

When the authentication server 300 receives the print information while OFF from the printer 10 in T360, the authentication server 300 identifies the device ID "dv1" in this information and updates the ON-printed sheet and the OFF-printed sheet in the authentication table 338 in association with the device ID "dv1" to the ON-printed sheet "0" and the OFF-printed sheet "100" in the print information while OFF, respectively, in T364. Next, the authentication server 300 adds a fourth predetermined number of sheets "100" to the number of print sheets when OFF "100" in the print information while OFF and stores the obtained print limit "200" in the authentication table 338. The fourth predetermined number of sheets may be the same as or different from the first predetermined number of sheets.

T370 of FIG. 8 is the same as T342 of FIG. 7. T372 is the same as T360 except that the print information while OFF does not include the ON-printed sheet. In T374, the printer 10 resets the OFF-printed sheet in the print table 38.

When the authentication server 300 receives the print information while OFF from the printer 10 in T372, the authentication server 300 identifies the device ID "dv1" in this information and adds the OFF-printed sheet "100" in the print information while OFF to the OFF-printed sheet "100" in the authentication table 338 associated with the device ID "dv1" in T376. Consequently, the OFF-printed sheet in the authentication table 338 is updated to "200". Next, in T378, the authentication server 300 determines that the OFF-printed sheet "200" in the authentication table 338 is equal to or greater than the print limit "200", in other words, the OFF-printed sheet has reached the print limit, and sends a shift request to the printer 10 in T380. The shift request is a signal for requesting shift of the state of the printer 10 to the print prohibition state. T382 is the same as T164 of FIG. 5. T390, T392, T398, T400 are the same as T170, T172, T178, T180 of FIG. 5, respectively. With such a configuration, printing can be prevented from being unlimitedly permitted after the state of the printer 10 has been shifted to the second print permission state in the state in which the communication state between the printer 10 and the management server 200 is the first communication-disabled state.

The printer 10 shifts the state of the printer 10 from the second print permission state to the normal state when the communication state between the printer 10 and the management server 200 changes from the first communication-disabled state to the first communication-enabled state before the OFF-printed sheet reaches the print limit while the state of the printer is the second print permission state. In this case, the authentication server 300 does not send the one-time code OC2 to the terminal device 100. With such a configuration, the authentication server 300 sending an unnecessary one-time code can be prevented.

Then, the processes same as T352 to T356 of FIG. 7 are executed by using the one-time code OC2 between the printer 10 and the authentication server 300. Next, in T408, the printer 10 shifts the state of the printer 10 from the print prohibition state to the third print permission state. T410 is the same as T372 except that the OFF-printed sheet "0" is used. When the authentication server 300 receives the print information while OFF from the printer 10 in T410, the authentication server 300 updates the OFF-printed sheet and the print limit in the authentication table 338 associated with the device ID "dv1" in T412 of FIG. 9. In the present case, since the OFF-printed sheet in the print information while OFF is "0", the OFF-printed sheet "200" in the authentication table 338 is not changed. The authentication server 300 stores, in the authentication table 338, the print limit "300" obtained by adding a fifth predetermined number of sheets "100" to the print limit "200" in the authentication table 338. The fifth predetermined number of sheets may be the same or different from the fourth predetermined number of sheets.

In T420, the printer 10 executes printing and updates the OFF-printed sheet in the print table 38 from "0" to "50". T422 is the same as T372 of FIG. 8 except that the OFF-printed sheet "50" is used. T424 is the same as T374.

When the authentication server 300 receives the print information while OFF from the printer 10 in T422, the authentication server 300 updates the OFF-printed sheet in the authentication table 338 associated with the device ID "dv1" in T426. The authentication server 300 adds the OFF-printed sheet "50" in the print information while OFF to the OFF-printed sheet "200" in the authentication table 338 associated with the device ID "dv1", and stores the new OFF-printed sheet "250" in the authentication table 338. Next, in T428, the authentication server 300 determines that the OFF-printed sheet "250" in the authentication table 338 is less than the print limit "300", in other words, the OFF-printed sheet has not reached the print limit. In this case, the authentication server 300 does not generate a new one-time code.

T430 to T446 are the same as T200 to T216 of FIG. 6. T450 to T454 are the same as T230 to T234. When the authentication server 300 determines that the communication state between the authentication server 300 and the management server 200 has changed from the second communication-disabled state to the second communication-enabled state, the authentication server 300 identifies the ON-printed sheet "0" and the OFF-printed sheet "250" in the authentication table 338 associated with the device ID "dv1", and sends, to the management server 200, notification information including the device ID "dv1", the identified ON-printed sheet "0" and the identified OFF-printed sheet "250" in T456. Next, in T458, the authentication server 300 resets the ON-printed sheet, the OFF-printed sheet and the print limit in the authentication table 338. T460 is the same as T224.

(Effects of Present Embodiment)

With the above configuration, when the authentication server 300 cannot communicate with the management server 200 due to malfunction of the management server 200 (FIG. 7), the authentication server 300 sends the one-time code OC1 to the terminal device 100 (T332 of FIG. 7). When the printer 10 cannot communicate with the management server 200 due to malfunction of the management server 200 (FIG. 7), the printer 10 shifts the state of the printer 10 from the normal state to the print prohibition state (T346 of FIG. 7). When the input of the one-time code OC1 is accepted (T350) and the authentication using the one-time code OC1 succeeds (T354, T356) while the state of the printer 10 is the print prohibition state, the printer 10 shifts the state of the printer 10 from the print prohibition state to the second print permission state (T358). Accordingly, when the management server 200 cannot execute communication due to malfunction of the management server 200, it is possible to cause the printer 10 to execute printing.

(First Modification)

In FIG. 4, the authentication server 300 may execute the processes from T130 when the authentication server 300 obtains an instruction from a user who learned that the communication state between the printer 10 and the management server 200 had changed from the first communication-enabled state to the first communication-disabled state. For example, when the printer 10 determines that the management server 200 is down, the printer 10 may display, on the display unit 14, down information indicating that the management server 200 is down. Then, when the user of the printer 10 confirms the down information displayed on the display unit 14, the user of the printer 10 may use the terminal device 100 to send an instruction to generate a one-time code to the authentication server 300. In this case, when the authentication server 300 receives the instruction from the terminal device 100, the authentication server 300 determines that the communication state between the authentication server 300 and the management server 200 is the second communication-disabled state and executes the processes from T130. In the present modification, the authentication server 300 may not periodically send the communication confirmation signal to the management server 200. In the present modification, T20 and T22 of FIGS. 3, T110 and T112 of FIG. 4 can be omitted.

(Second Modification)

The communication system 2 may further include a monitoring device configured to monitor the communication state between the printer 10 and the management server 200. In the present modification, when the monitoring device detects that the communication state between the printer 10 and the management server 200 has changed from the first communication-enabled state to the first communication-disabled state, the monitoring device sends communication-disabled information to the printer 10. In the present modification, when the printer 10 receives the communication-disabled information from the monitoring device, the printer 10 executes the processes from T140 of FIG. 4 and the processes from T340 of FIG. 7.

(Third Modification)

In T132 of FIG. 4, the authentication server 300 may send the one-time code OC1 to the terminal device 100 by using a Short Message Service (SMS). In another modification, in T132 of FIG. 4, the authentication server 300 may send the one-time code OC1 to an application program installed in the terminal device 100.

(Fourth Modification)

The authentication server 300 may periodically send the one-time code to the terminal device 100 while the communication state between the printer 10 and the management server 200 is the first communication-enabled state.

(Fifth Modification)

The terminal device 100 may be configured to send the one-time code OC1 to the printer 10 in response to accepting the input of the one-time code OC1 after T146 of FIG. 4. In the present modification, the printer 10 accepts the input of the one-time code OC1 from the user via the terminal device 100.

(Sixth Modification)

The printer 10 may shift the state of the printer 10 from the normal state to the print prohibition state without going through the first print permission state when the communication state between the printer 10 and the management server 200 changes from the first communication-enabled state to the first communication-disabled state. In the present modification, T140 to T144 of FIGS. 4 and T340 to T344 of FIG. 7 can be omitted.

(Seventh Modification)

In the first and second embodiments, it is determined whether the state of the printer 10 is to be shifted from the first printer permission state, the second print permission state and the third print permission state by using the number of print sheets used in printing. Instead of this, the number of dots of ink used in printing may be used. In another modification, durations of the first print permission state, the second print permission state and the third print permission state may be used. For example, when the duration of the first print permission state passes a first predetermined time, the printer 10 may shift the state of the printer 10 from the first print permission state to the print prohibition state, and when the duration of the second print permission state passes a second predetermined time, the printer 10 may shift the state of the printer 10 from the second print permission state to the printer prohibition state. The second predetermined time may be the same as or different from the first predetermined time.

(Eighth Modification)

The printer 10 may not be able to shift to the third print permission state. In the modification of the first embodiment, T166 to T184 of FIGS. 5 and T190, T192 of FIG. 6 can be omitted. In the present modification, "shift the state of the printer from the second permission state to a second prohibition state in which printing is prohibited" by "the printer", "determine whether the second predetermined condition is satisfied" by "the printer", "send an authentication information sending request" by "the printer", "send third authentication information different from the first authentication information to the external device" by "the authentication server", "accept an input of fourth authentication information from the user" by "the printer", and "shift the state of the printer from the second prohibition state to a fourth permission state in which printing is permitted" by "the printer" can be omitted. In a modification of the second modification, T390 to T410 of FIGS. 8, T412 to T428 of FIG. 9 can be omitted. In the present modification, "shift the state of the printer from the second permission state to a second prohibition state in which printing is prohibited" by "the printer", "determine whether the second predetermined condition is satisfied" by "the authentication server", "send, to the printer, a shift request requesting the printer to shift the state of the printer from the second permission state to the second prohibition state" by "the authentication server", "send third authentication information different from the first authentication information to the external device" by "the authentication server", "accept an input of fourth authentication information from the user" by "the printer", and "shift the state of the printer from the second prohibition state to a fourth permission state in which printing is permitted" by "the printer" can be omitted.

(Ninth Modification)

The management server 200 may be configured of a single server or may include a plurality of servers. For example, the management server 200 may include a first server and a second server. In the present modification, the first server receives the notification information from the printer 10 (T52, T72 of FIG. 3). The second server manages the notification information received by the first server (T56, T76 of FIG. 3).

(Tenth Modification)

The authentication server 300 may be configured of a single server or may include a plurality of servers. For example, in the first embodiment, the authentication server 300 may include a first server and a second server. In the present modification, the first server sends the one-time code to the terminal device 100 (T132 of FIG. 4). The second server sends the one-time code to the printer 10 (T134 of FIG. 4). The second server further receives the one-time code sending request from the printer 10 (T166 of FIG. 5). Further, for example, in the second embodiment, the authentication server 300 may include a first server, a second server and a third server. In the present modification, the first server sends the one-time code to the terminal device 100 (T332 of FIG. 7). The second server receives the one-time code from the printer 10 (T352 of FIG. 7), and when the authentication using the one-time code succeeds (T354), the second server sends the success information to the printer (T356). The third server determines if the OFF-printed sheet has reached the print limit while the state of the printer 10 is the second print permission state (T378 of FIG. 8). When it is determined that the OFF-printed sheet has reached the print limit, the second server sends the shift request to the printer 10 (T380).

(Eleventh Modification)

In the above embodiments, the processes of FIGS. 3 to 9 are implemented by a software (e.g., the program 36, 236, 336), however, at least one of these processes may be implemented by hardware such as a logic circuit.

What is claimed is:

1. A communication system comprising:
a printer;
a management server; and
an authentication server,
wherein the management server comprises:
   a controller configured to:
      receive, from the printer, usage information related to usage of the printer and manage the usage information,
the authentication server comprises:
   a controller configured to:
      in a case where a communication state between the authentication server and the management server is a communication-disabled state, send first authentication information to an external device;
the printer comprises:
   a controller configured to:
      in a case where a communication state between the printer and the management server changes from a communication-enabled state to a communication-disabled state, shift a state of the printer from a first permission state in which printing is permitted to a first prohibition state in which printing is prohibited;
      while the state of the printer is the first prohibition state, accept an input of second authentication information from a user; and
      in a case where the input of the second authentication information is accepted and the second authentication information matches the first authentication information, shift the state of the printer from the first prohibition state to a second permission state in which printing is permitted.

2. The communication system as in claim 1, wherein
the controller of the authentication server is further configured to:
in the case where the communication state between the authentication server and the management server is the communication-disabled state, send the first authentication information to the printer,
the controller of the printer is further configured to:
receive the first authentication information from the authentication server,
wherein in a case where the input of the second authentication information is accepted and the second authentication information matches the received first authentication information, the controller of the printer is configured to shift the state of the printer from the first prohibition state to the second permission state.

3. The communication system as in claim 1, wherein
the controller of the printer is further configured to:
in a case where the input of the second authentication information is accepted, send the second authentication information to the authentication server,
the controller of the authentication server is further configured to:
receive the second authentication information from the printer; and
in a case where the received second authentication information matches the first authentication information, send, to the printer, success information indicating that authentication has succeeded,
wherein in a case where the input of the second authentication information is accepted and the success information is received from the authentication server, the controller of the printer is configured to shift the state of the printer from the first prohibition state to the second permission state.

4. The communication system as in claim 1, wherein
in the case where the communication state between the printer and the management server changes from the communication-enabled state to the communication-disabled state, the controller of the printer is configured to shift the state of the printer from the first permission state to the first prohibition state through a third permission state,
wherein the third permission state continues until a first predetermined condition is satisfied,
wherein the first predetermined condition is satisfied in a case where at least one of a first case and a second case is satisfied, wherein the first case is a case where usage of the printer in the third permission state reaches a first predetermined amount, and the second case is a case where a duration of the third permission state reaches a first predetermined time.

5. The communication system as in claim 1, wherein
the controller of the printer is further configured to:
in a case where a second predetermined condition is satisfied while the state of the printer is the second permission state, shift the state of the printer from the second permission state to a second prohibition state in which printing is prohibited,
wherein the second predetermined condition is satisfied in a case where at least one of a third case and a fourth case is satisfied, wherein the third case is a case where usage of the printer in the second permission state reaches a second predetermined amount, and the fourth case is a case where a duration of the second permission state reaches a second predetermined time.

6. The communication system as in claim 5, wherein
the controller of the printer is further configured to:
while the state of the printer is the second permission state, determine whether the second predetermined condition is satisfied,
wherein in a case where it is determined that the second predetermined condition is satisfied, the controller of the printer is configured to shift the state of the printer from the second permission state to the second prohibition state.

7. The communication system as in claim 6, wherein
the controller of the printer is further configured to:
in the case where it is determined that the second predetermined condition is satisfied, send an authentication information sending request to request sending of new authentication information to the authentication server,
the controller of the authentication server is further configured to:
in a case where the authentication information sending request is received from the printer, send third authentication information different from the first authentication information to the external device,
the controller of the printer is further configured to:
while the state of the printer is the second prohibition state, accept an input of fourth authentication information from the user; and
in a case where the input of the fourth authentication information is accepted and the fourth authentication information matches the third authentication information, shift the state of the printer from the second prohibition state to a fourth permission state in which printing is permitted.

8. The communication system as in claim 7, wherein
the controller of the printer is further configured to:
in a case where the communication state between the printer and the management server changes from the communication-disabled state to the communication-enabled state before the second predetermined condition is satisfied while the state of the printer is the second permission state, shift the state of the printer from the second permission state to the first permission state,
wherein in the case where the communication state between the printer and the management server changes from the communication-disabled state to the communication-enabled state before the second predetermined condition is satisfied while the state of the printer is the second permission state, the authentication information sending request is not sent to the authentication server.

9. The communication system as in claim 5, wherein
the controller of the authentication server is further configured to:
while the state of the printer is the second permission state, determine whether the second predetermined condition is satisfied; and
in a case where it is determined that the second predetermined condition is satisfied, send, to the printer, a shift request requesting the printer to shift the state of the printer from the second permission state to the second prohibition state,
wherein in a case where the shift request is received from the authentication server, the controller of the printer is configured to shift the state of the printer from the second permission state to the second prohibition state.

10. The communication system as in claim 9, wherein
the controller of the authentication server is further configured to:
in the case where it is determined that the second predetermined condition is satisfied, send third authentication information different from the first authentication information to the external device,
the controller of the printer is further configured to:
while the state of the printer is the second prohibition state, accept an input of fourth authentication information from the user; and
in a case where the input of the fourth authentication information is accepted and the fourth authentication information matches the third authentication information, shift the state of the printer from the second prohibition state to a fourth permission state in which printing is permitted.

11. The communication system as in claim 10, wherein
the controller of the printer is further configured to:
in a case where the communication state between the printer and the management server changes from the communication-disabled state to the communication-enabled state before the second predetermined condition is satisfied while the state of the printer is the second permission state, shift the state of the printer from the second permission state to the first permission state,
wherein in a case where the communication state between the authentication server and the management server changes from the communication-disabled state to the communication-enabled state before the second predetermined condition is satisfied while the state of the printer is the second permission state, the third authentication information is not sent to the external device.

12. The communication system as in claim 1, wherein
the printer further comprises an operation unit, and
while the state of the printer is the first prohibition state, the controller of the printer is configured to accept the input of the second authentication information from the user via the operation unit.

13. A non-transitory computer-readable recording medium storing computer-readable instructions for an authentication server used in a communication system,
the communication system comprising:
a printer;
a management server; and
the authentication server,
wherein the authentication server comprises:
a processor,
wherein the computer-readable instructions, when executed by the processor, cause the authentication server to:
in a case where a communication state between the authentication server and the management server is a communication-disabled state, send first authentication information to an external device,
wherein the management server is configured to receive usage information related to usage of the printer from the printer and is configured to manage the received usage information,
wherein the printer is configured to:
in a case where a communication state between the printer and the management server changes from a communication-enabled state to a communication-disabled state, shift a state of the printer from a first permission state in which printing is permitted to a first prohibition state in which printing is prohibited;
while the state of the printer is the first prohibition state, accept an input of second authentication information from a user; and
in a case where the input of the second authentication information is accepted and the second authentication information matches the first authentication information, shift the state of the printer from the first prohibition state to a second permission state in which printing is permitted.

14. The non-transitory computer-readable recording medium as in claim 13, wherein
the computer-readable instructions, when executed by the processor, further cause the authentication server to:
receive the second authentication information from the printer; and
in a case where the received second authentication information matches the first authentication information, send, to the printer, success information indicating that authentication has succeeded,
wherein in a case where the input of the second authentication information is accepted and the success information is received from the authentication server, the printer is configured to shift the state of the printer from the first prohibition state to the second permission state.

15. The non-transitory computer-readable recording medium as in claim 13, wherein
the computer-readable instructions, when executed by the processor, further cause the authentication server to:
while the state of the printer is the second permission state, determine whether a predetermined condition is satisfied; and
in a case where it is determined that the predetermined condition is satisfied, send, to the printer, a shift request requesting the printer to shift the state of the printer from the second permission state to a second prohibition state in which printing is prohibited,
wherein the predetermined condition is satisfied in a case where at least one of a first case and a second case is satisfied, wherein the first case is a case where usage of the printer in the second permission state reaches a second predetermined amount, and the second case is a case where a duration of the second permission state reaches a second predetermined time.

16. The non-transitory computer-readable recording medium as in claim 15, wherein
the computer-readable instructions, when executed by the processor, further cause the authentication server to:
in the case where it is determined that the predetermined condition is satisfied, send third authentication information different from the first authentication information to the external device,
wherein the printer is configured to:
while the state of the printer is the second prohibition state, accept an input of fourth authentication information from the user; and
in a case where the input of the fourth authentication information is accepted and the fourth authentication information matches the third authentication information, shift the state of the printer from the second prohibition state to a fourth permission state in which printing is permitted.

17. The non-transitory computer-readable recording medium as in claim 16, wherein
in a case where the communication state between the printer and the management server changes from the communication-disabled state to the communication-enabled state before the predetermined condition is satisfied while the state of the printer is the second permission state, the printer is configured to shift the state of the printer from the second permission state to the first permission state, wherein in a case where the communication state between the authentication server and the management server changes from the communication-disabled state to the communication-enabled state before the second predetermined condition is satisfied while the state of the printer is the second permission state, the third authentication information is not sent to the external device.

18. A non-transitory computer-readable recording medium storing computer-readable instructions for a printer used in a communication system, the communication system comprising:
the printer;
a management server; and
an authentication server,
wherein the printer comprises:
a processor,
wherein the computer-readable instructions, when executed by the processor, cause the printer to:
in a case where a communication state between the printer and the management server changes from a communication-enabled state to a communication-disabled state, shift a state of the printer from a first permission state in which printing is permitted to a first prohibition state in which printing is prohibited, wherein the management server is configured to manage usage information related to usage of the printer and received from the printer, wherein the authentication server is configured to, in a case where a communication state between the authentication server and the management server is a communication-disabled state, send first authentication information to an external device;
while the state of the printer is the first prohibition state, accept an input of second authentication information from a user; and
in a case where the input of the second authentication information is accepted and the second authentication information matches the first authentication information, shift the state of the printer from the first prohibition state to a second permission state in which printing is permitted.

19. The non-transitory computer-readable recording medium as in claim 18, wherein the computer-readable instructions, when executed by the processor, further cause the printer to:
receive the first authentication information from the authentication server,
wherein in a case where the communication state between the authentication server and the management server is the communication-disabled state, the authentication server is configured to send the first authentication information to the printer,
wherein in a case where the input of the second authentication information is accepted and the second authentication information matches the received first authentication information, the state of the printer is shifted from the first prohibition state to the second permission state.

20. The non-transitory computer-readable recording medium as in claim 18, wherein the computer-readable instructions, when executed by the processor, further cause the printer to:
while the state of the printer is the second permission state, determine whether a predetermined condition is satisfied, and
wherein in a case where it is determined that the predetermined condition is satisfied, shift the state of the printer from the second permission state to a second prohibition state in which printing is prohibited,
wherein the predetermined condition is satisfied in a case where at least one of a first case and a second case is satisfied, wherein the first case is a case where usage of the printer in the second permission state reaches a predetermined amount, and the second case is a case where a duration of the second permission state reaches a predetermined time.

21. The non-transitory computer-readable recording medium as in claim 20, wherein the computer-readable instructions, when executed by the processor, further cause the printer to:
in the case where it is determined that the predetermined condition is satisfied, send an authentication information sending request to request sending of new authentication information to the authentication server, wherein the authentication server is configured to, in a case where the authentication information sending request is received from the printer, send third authentication information different from the first authentication information to the external device;
while the state of the printer is the second prohibition state, accept an input of fourth authentication information from the user; and
in a case where the input of the fourth authentication information is accepted and the fourth authentication information matches the third authentication information, shift the state of the printer from the second prohibition state to a fourth permission state in which printing is permitted.

22. The non-transitory computer-readable recording medium as in claim 21, wherein the computer-readable instructions, when executed by the processor, further cause the printer to:
in a case where the communication state between the printer and the management server changes from the communication-disabled state to the communication-enabled state before the predetermined condition is satisfied while the state of the printer is the second permission state, shift the state of the printer from the second permission state to the first permission state,
wherein in a case where the communication state between the printer and the management server changes from the communication-disabled state to the communication-enabled state before the predetermined condition is satisfied while the state of the printer is the second permission state, the authentication information sending request is not sent to the authentication server.

23. The non-transitory computer-readable recording medium as in claim 21, wherein the printer further comprises an operation unit, and
while the state of the printer is the first prohibition state, the input of the second authentication information is accepted from the user via the operation unit.

* * * * *